(12) United States Patent
Sato

(10) Patent No.: US 9,447,872 B2
(45) Date of Patent: Sep. 20, 2016

(54) DEVICE FOR CONTROLLING LOCK-UP CAPACITY OF TORQUE CONVERTER

(71) Applicant: JATCO LTD, Fuji-shi, Shizuoka (JP)

(72) Inventor: Osamu Sato, Fujisawa (JP)

(73) Assignee: JATCO LTD, Fuji-Shi (JP)

( * ) Notice: Subject to any disclaimer, the term of this patent is extended or adjusted under 35 U.S.C. 154(b) by 74 days.

(21) Appl. No.: 14/382,109

(22) PCT Filed: Nov. 16, 2012

(86) PCT No.: PCT/JP2012/079727
§ 371 (c)(1),
(2) Date: Aug. 29, 2014

(87) PCT Pub. No.: WO2013/132701
PCT Pub. Date: Sep. 12, 2013

(65) Prior Publication Data
US 2015/0032349 A1    Jan. 29, 2015

(30) Foreign Application Priority Data

Mar. 5, 2012   (JP) .................................. 2012-047523

(51) Int. Cl.
| | |
|---|---|
| *F16H 61/14* | (2006.01) |
| *F16H 48/06* | (2006.01) |
| *F16H 45/02* | (2006.01) |
| *F16D 33/18* | (2006.01) |
| *F16D 48/06* | (2006.01) |

(Continued)

(52) U.S. Cl.
CPC .............. *F16H 61/143* (2013.01); *F16D 33/18* (2013.01); *F16D 48/06* (2013.01); *F16H 45/02* (2013.01); *F16D 2500/3065* (2013.01); *F16D 2500/30406* (2013.01); *F16D 2500/3108* (2013.01); *F16D 2500/5085* (2013.01); *F16D 2500/50236* (2013.01); *F16D 2500/70406* (2013.01); *F16H 2059/186* (2013.01); *F16H 2059/467* (2013.01); *F16H 2061/145* (2013.01); *F16H 2342/044* (2013.01)

(58) Field of Classification Search
None
See application file for complete search history.

(56) References Cited

U.S. PATENT DOCUMENTS

| | | | | |
|---|---|---|---|---|
| 4,582,185 | A * | 4/1986 | Grimes et al. | ................. 477/169 |
| 5,667,458 | A * | 9/1997 | Narita et al. | .................. 477/169 |

(Continued)

FOREIGN PATENT DOCUMENTS

| | | |
|---|---|---|
| JP | 11-182672 A | 7/1999 |
| JP | 2002-130463 A | 5/2002 |

(Continued)

*Primary Examiner* — Robert Hodge
*Assistant Examiner* — Terry Chau
(74) *Attorney, Agent, or Firm* — Foley & Lardner LLP

(57) ABSTRACT

A controller is provided with a lock-up capacity control means for controlling a lock-up capacity to a predetermined target capacity when a transition to a coast running state occurs, a timing means for measuring a time during which a slippage, which is a difference between a revolution speed (engine speed) of an input element and a revolution speed (turbine speed) of an output element, is within a predetermined range when the lock-up capacity is controlled to the predetermined target capacity, and a capacity learning means for making a learning-correction to the predetermined target capacity such that the time measured by the timing means is brought to a predetermined target time. By virtue of the learning-correction, it is possible to accurately control the lock-up capacity when the transition to the coast running state has occurred.

7 Claims, 9 Drawing Sheets

(51) Int. Cl.
  *F16H 59/18* (2006.01)
  *F16H 59/46* (2006.01)

(56) References Cited

U.S. PATENT DOCUMENTS

| 5,916,293 | A | * | 6/1999 | Katakura et al. | 701/67 |
| 5,935,043 | A | * | 8/1999 | Watanabe et al. | 477/169 |
| 6,652,415 | B2 | | 11/2003 | Segawa et al. | |
| 6,878,095 | B2 | * | 4/2005 | Shigyo | 477/86 |
| 7,264,574 | B2 | | 9/2007 | Tohta et al. | |
| 8,292,785 | B2 | * | 10/2012 | Walker et al. | 477/176 |
| 2002/0052265 | A1 | | 5/2002 | Segawa et al. | |
| 2003/0060330 | A1 | * | 3/2003 | Sato et al. | 477/174 |
| 2004/0111203 | A1 | * | 6/2004 | Higashimata et al. | 701/51 |
| 2006/0073937 | A1 | | 4/2006 | Tohta et al. | |

FOREIGN PATENT DOCUMENTS

| JP | 2006-125629 A | 5/2006 |
| JP | 2008-008321 A | 1/2008 |
| JP | 2012-021549 A | 2/2012 |

* cited by examiner

DEVICE FOR CONTROLLING LOCK-UP CAPACITY OF TORQUE CONVERTER

TECHNICAL FIELD

The present invention relates to a device for controlling a lock-up capacity of a vehicle torque converter.

BACKGROUND ART

Conventionally, in order to suppress a shock from occurring in a transient state from a drive running state where an engine is driven and run with an accelerator pedal depressed for vehicle running to a coast running state with a zero accelerator opening, a device for controlling a capacity (i.e., a lock-up capacity) of a lock-up mechanism of a torque converter is generally known. For instance, a device, disclosed in Patent document 1, is configured to disable the lock-up mechanism to be engaged by reducing the lock-up capacity to a minimum capacity corresponding to a standby pressure by feed-forward control during a predetermined time period after having shifted to a coast running state.

However, in the previously-discussed prior art device, when the vehicle has shifted to a coast running state, there is a possibility that the lock-up capacity cannot be accurately controlled due to individual differences of lock-up capacity control devices manufactured.

CITATION LIST

Patent Literature

Patent document 1: Japanese patent provisional publication No. 2006-125629 (A)

SUMMARY OF INVENTION

It is, therefore, in view of the previously-described drawbacks of the prior art, an object of the invention to provide a lock-up capacity control device of a torque converter capable of more accurately controlling a lock-up capacity when a transition to a coast running state has occurred.

A lock-up capacity control device of a torque converter is provided with a lock-up capacity control means for controlling a lock-up capacity to a predetermined target capacity when a transition from a drive running state to a coast running state occurs, a timing means for measuring a time (a time length) during which a slippage, which is a difference between a revolution speed of an input element and a revolution speed of an output element, is within a predetermined range when the lock-up capacity control means controls the lock-up capacity to the target capacity, and a capacity learning means for making a learning-correction to the target capacity such that the time measured by the timing means is brought to a predetermined target time.

According to the invention, by virtue of the learning-correction made to the target capacity such that the time during which the slippage is within the predetermined range is brought to the predetermined target time, it is possible to more accurately control the lock-up capacity when a transition to a coast running state has occurred.

DESCRIPTION OF EMBODIMENTS

First Embodiment

Figure 1:
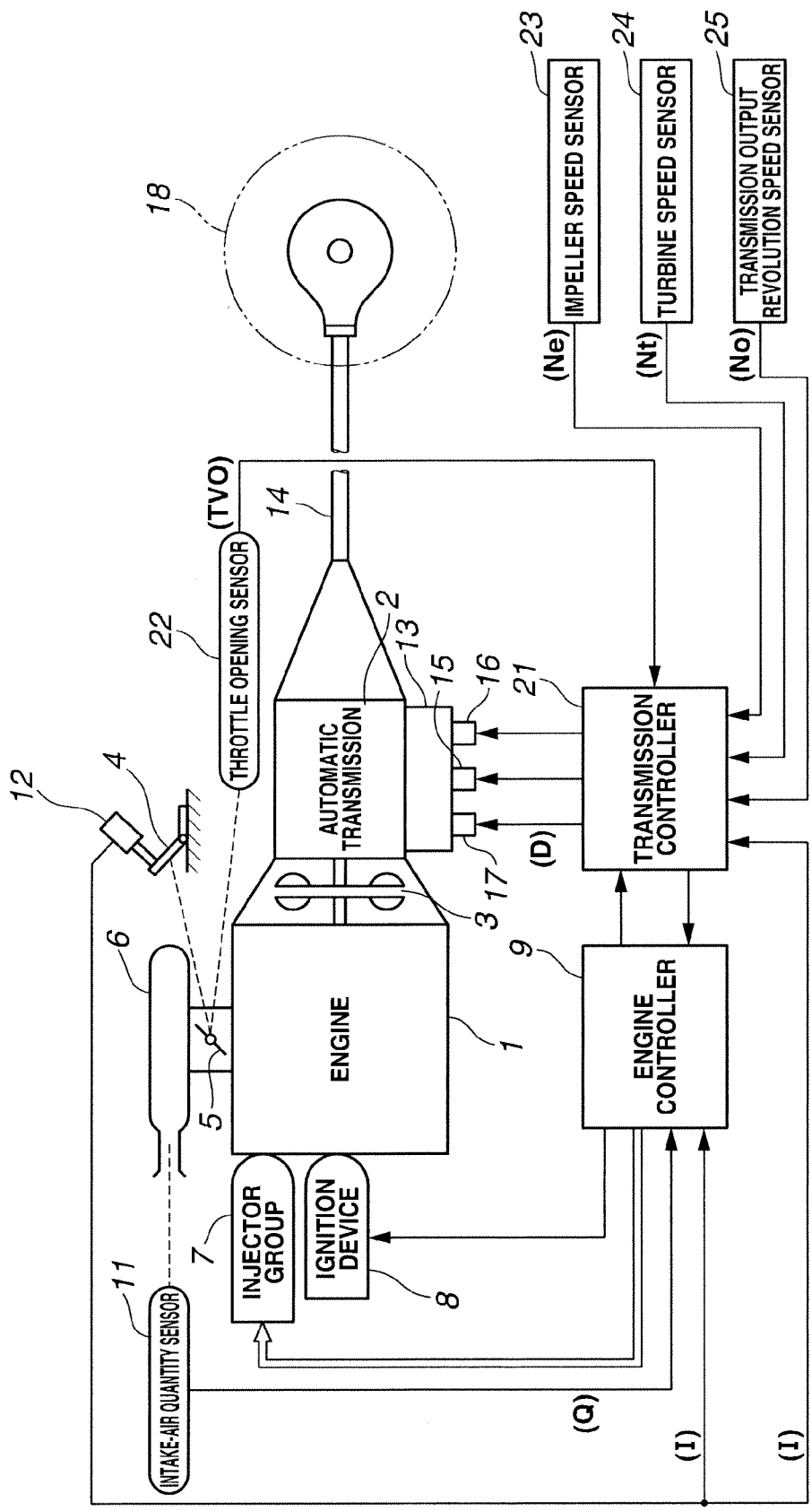
FIG. 1 is a system diagram illustrating a vehicle power-transmission system to which a lock-up capacity control device of the first embodiment has been applied.

A lock-up capacity control device of the first embodiment is applied to a lock-up mechanism installed in a torque converter in a vehicle power-transmission system. First, the system configuration is hereunder described. FIG. 1 is the system diagram showing a vehicle power train (a power transmission system) as well as its control system. The power train has an engine 1 serving as a prime mover, an automatic transmission 2 serving as a speed change mechanism (a transmission), and a torque converter 3 interposed between the engine and the transmission for drivingly coupling them. Engine 1 is equipped with a throttle valve 5 whose opening is adjusted responsively to an amount of depression of an accelerator pedal 4 (accelerator opening), for drawing intake air of an air quantity, corresponding to the throttle opening TVO and engine speed Ne, through an air cleaner 6. Engine 1 is also equipped with a group of injectors 7 provided for each engine cylinder and an ignition device 8. Rotation from engine 1 is inputted via the torque converter 3 to the automatic transmission 2. Torque converter 3 is a torque-multipliable fluid coupling configured to transmit rotation of an input element (a pump impeller) driven by the engine 1, while torque-multiplying and absorbing torque fluctuations through internal working fluid to an output element (a turbine runner) in a converter state, and then direct the turbine rotation toward the automatic transmission 2. Automatic transmission 2 is configured such that a selected gear shift stage is determined by the ON-OFF setting (the ON-OFF combination) of shift solenoids 15, 16 located inside a control valve 13. The automatic transmission is also configured to speed-change input rotation at a gear ratio determined depending on the selected shift stage and transmit the speed-changed power from an output shaft 14 to a drive road wheel 18 for vehicle running.

Torque converter 3 incorporates therein a lock-up clutch serving as a lock-up mechanism for mechanically connecting between the input and output elements and for restricting relative rotation between them (such relative-rotation restriction containing a lock-up state where the relative rotation is zero). The lock-up clutch is configured such that its engagement pressure (a lock-up pressure) is determined by a drive duty command D of a lock-up solenoid 17 located inside the control valve 13. The lock-up clutch is also configured or provided to permit the relative rotation between the input and output elements of torque converter 3 to be restricted by connecting between these elements depending on the determined lock-up pressure. The lock-up pressure determines a lock-up clutch engagement capacity (a lock-up capacity TLU). The lock-up clutch is configured to engage the input element (the pump impeller) of torque converter 3 placed on the side of engine 1 with the output element (the turbine runner) placed on the side of automatic transmission 2 so as to enable transmission of torque whose magnitude is dependent on the lock-up capacity TLU. For instance, when the lock-up capacity TLU is determined or set as a zero capacity, a non-engaging state (a converter state) where the input and output element are uncoupled becomes established. In contrast, when a certain magnitude of lock-up capacity TLU is given, an engaging state (a lock-up state) where the input and output elements are coupled or engaged becomes established. By the way, the engaging state becomes switched, depending on the magnitude relation between the transmitted torque and lock-up capacity TLU between the input and output elements, to either a complete engaging state (a complete lock-up state) where the input and output elements are coupled with each other without any relative rotation between them or a slip engaging state (a slip lock-up state) where the input and output elements are coupled with each other with a relative rotation between them.

An engine controller 9 controls an operating condition of engine 1. Engine controller 9 receives a signal Q from an intake-air quantity sensor 11 that detects an intake-air quantity Q and a signal I from an idle switch 12 that is turned ON when the accelerator pedal 4 is released. Engine controller 9 is configured to inject a given amount of fuel from the injector group 7 into a combustion chamber of the specified engine cylinder of engine 1 and ignite a spark plug of the specified engine cylinder at a given ignition timing through the ignition device 8, on the basis of these input informational data. Engine controller 9 is also configured to execute fuel-cut in which fuel-injection (fuel-supply) from the injector group 7 is stopped when the driver's foot moves apart from the accelerator pedal 4 and thus the accelerator pedal becomes released. By the aid of the fuel-cut function, during coast running (in the embodiment, during a vehicle running state with a zero throttle opening), fuel-supply is stopped and thus wasteful fuel consumption is prevented, thereby improving fuel economy (reducing a fuel consumption rate). A start of fuel-cut (in other words, fuel cut-in) is carried out immediately after a predetermined cut-in delay time has expired from the point of time when throttle valve 5 has shifted to its fully-closed state during vehicle running. The cut-in delay time is generally set as a predetermined required time during which all of the in-conduit air existing between the throttle valve 5 fully closed and the combustion chamber of engine 1 can be drawn into the combustion chamber of engine 1. During execution of fuel-cut, the rotating element (i.e., the turbine runner) on the side of road wheel 18, which rotates together with the road wheel 18 rotating during coast running, and the rotating element (i.e., the pump impeller) on the side of engine 1 are coupled with each other mechanically by means of the lock-up mechanism, so as to prevent engine stall. Concretely, lock-up (slip lock-up), which occurs by slip-engagement of the lock-up clutch of torque converter 3, is carried out, so as to suppress an excessive drop in engine speed Ne. Also, when engine speed Ne becomes reduced to below a predetermined value, fuel-cut recovery, by which a given amount of fuel is re-injected from the injector group 7 into the combustion chamber of the specified engine cylinder of engine 1, is executed, so as to resume fuel-supply.

As a result of this, engine stall is prevented.

A transmission controller 21 controls the ON-OFF setting of shift solenoids 15, 16 and the drive duty command D of lock-up solenoid 17. Transmission controller 21 receives the signal I from the idle switch 12, a signal TVO from a throttle opening sensor 12 that detects the throttle opening TVO of the throttle valve 5, a signal Ne from an impeller speed sensor 23 that detects an input revolution speed of torque converter 3 (that is, engine speed Ne), a signal Nt from a turbine speed sensor 24 that detects an output revolution speed of torque converter 3 (that is, turbine speed Nt), and a signal No from a transmission output revolution speed sensor 25 that detects a revolution speed No of the transmission output shaft 14. Transmission controller 21 is configured to execute, based on these input informational data, shift control of automatic transmission 2 via generally-known arithmetic processing, as discussed below. That is to say, the transmission controller retrieves, based on the throttle opening TVO as well as the vehicle speed VSP derived from transmission output revolution speed No, a shift stage suitable for the current vehicle operating condition from a predetermined shift map, and executes ON-OFF switching of each of shift solenoids 15, 16 such that a shift to the suitable shift stage occurs.

Transmission controller 21 also constructs a lock-up capacity control device that controls the lock-up capacity TLU responsively to the vehicle operating condition. For instance, under a running state in which torque-multiplying action and torque-fluctuations absorbing action are not required (e.g., during constant-speed driving at high vehicle speeds), the transmission controller controls the lock-up capacity TLU so as to establish a complete lock-up state. In contrast, under a coast running state where fuel-cut is executed, the transmission controller controls the lock-up capacity TLU so as to establish a slip lock-up state that permits rotation of the transmission output shaft 14 to be transmitted to the engine 1 for the purpose of preventing engine stall. In particular, the latter lock-up is often called "coast lock-up". By the way, bi-directional communication is allowed between engine controller 9 and transmission controller 21. Depending on whether the lock-up clutch is engaged or released, cooperative control is performed so as to appropriately execute either fuel-cut or fuel-cut recovery.

Transmission controller 21 (hereinafter is referred to as "control device 21"), which serves as the lock-up capacity control device, is provided with a lock-up capacity control section for controlling the lock-up capacity TLU to a predetermined target capacity TLU*, a timing section for measuring a time Ts during which a slippage ΔN, which is a difference between a revolution speed (=engine speed Ne) of the input element (the pump impeller) and a revolution speed (=turbine speed Nt) of the output element (the turbine runner), is within a predetermined range when the lock-up capacity TLU during a time period from a point of time when a transition from a drive running state to a coast running state occurs to a point of time when coast lock-up is established (fuel-cut is executed) is controlled to the target capacity TLU*, and a capacity learning section for making a learning-correction to target lock-up capacity TLU*such that the measured time Ts is brought to a predetermined target time T*. By the way, in the shown embodiment, a state, in which throttle opening TVO is positive, engine torque Te (torque occurring in the output shaft of engine 1) is positive, and the torque is transmitted or directed from the input element to the output element so as to drive the output element, is called as "drive running state". In contrast, a state, in which throttle opening TVO is zero, is called as "coast running state".

Figure 2:
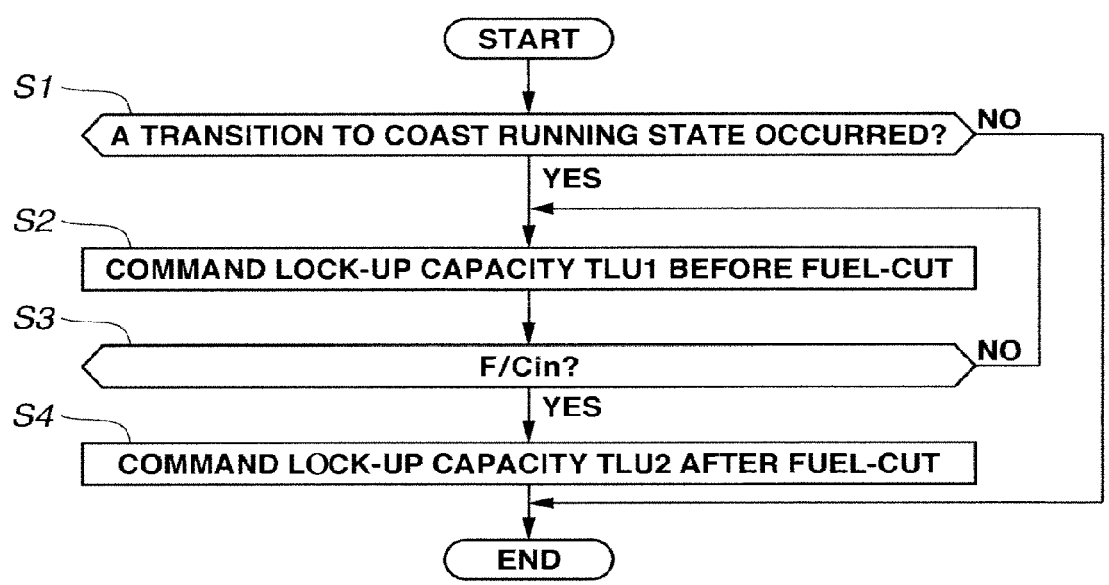
FIG. 2 is a flowchart illustrating lock-up capacity control processing performed by a lock-up capacity control section of the first embodiment.

Referring to FIG. 2, there is shown the flowchart illustrating the procedures of arithmetic processing executed within the lock-up capacity control section when a transition from a drive running state to a coast running state occurs. The arithmetic processing is executed as time-triggered interrupt routines to be triggered every predetermined time intervals.

First, at step S1, a check is made to determine, based on throttle opening TVO and the like, whether a transition from a drive running state to a coast running state occurs. That is, when throttle opening TVO becomes zero, it is determined that a transition to a coast running state has occurred. When it is determined that a transition to a coast running state has occurred, the routine proceeds to step S2. Conversely when it is determined that a transition to a coast running state has not occurred, the current control flow terminates.

At step S2, as a command value (a target capacity TLU*) of lock-up capacity TLU before execution of fuel-cut, a lock-up capacity TLU1 before fuel-cut is outputted. Thereafter, the routine proceeds to step S3.

At step S3, a check is made to determine whether fuel-cut has been executed. When fuel-cut has not yet been executed, the routine returns to step S2 so as to output the lock-up capacity TLU1 before fuel-cut. When fuel-cut has been executed, the routine proceeds to step S4.

At step S4, as a command value (a target capacity TLU*) of lock-up capacity TLU after execution of fuel-cut, a lock-up capacity TLU2 after fuel-cut is outputted, and then the current control flow terminates.

Figure 3:
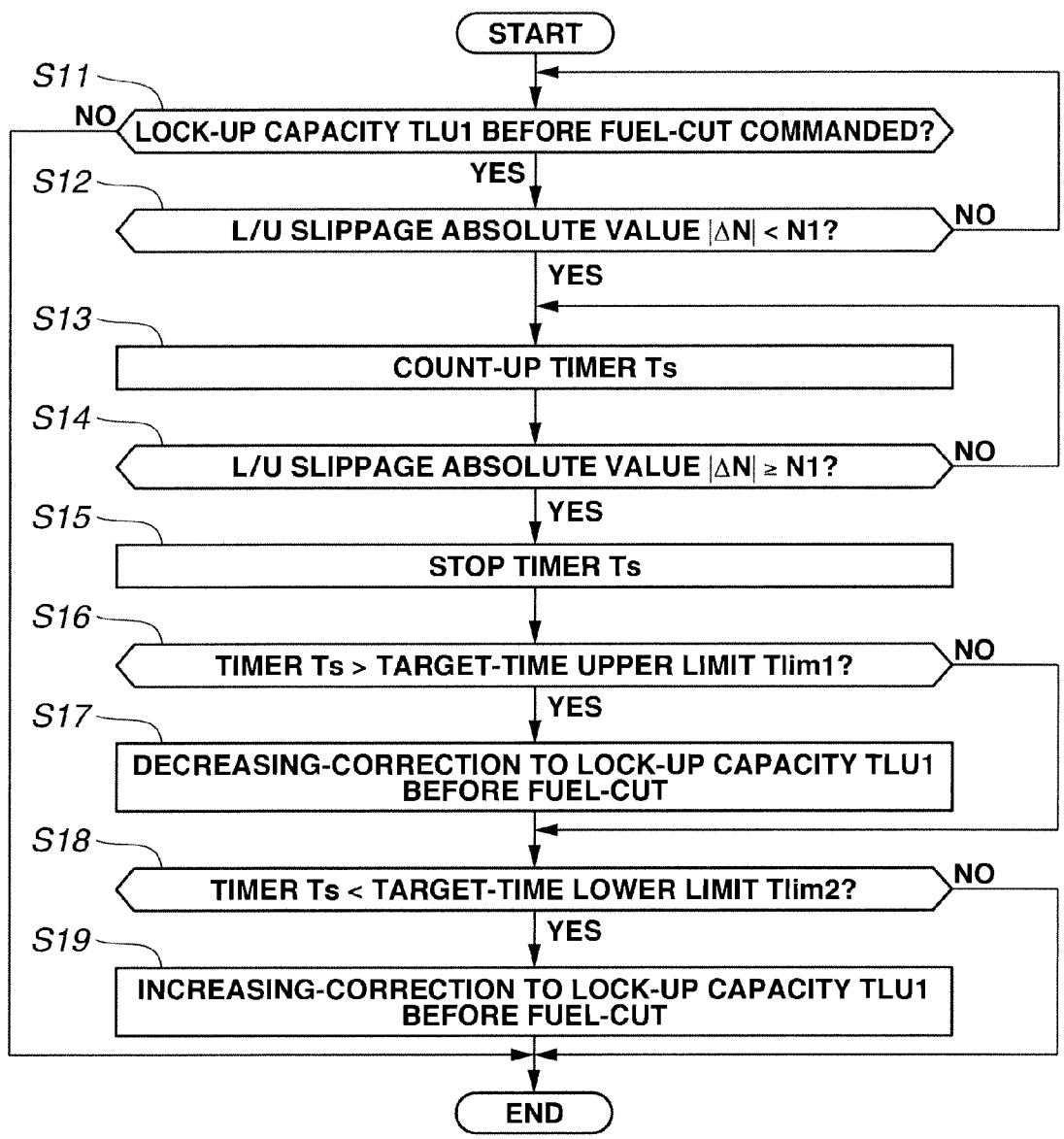
FIG. 3 is a flowchart illustrating target capacity learning-control processing performed by a capacity learning section and a timing section in the first, second, and third embodiments.

Referring to FIG. 3, there is shown the flowchart illustrating the procedures of arithmetic processing (learning control for target capacity TLU1 before execution of fuel-cut) executed within the capacity learning section and the timing section. The arithmetic processing is executed as time-triggered interrupt routines to be triggered every predetermined time intervals. The capacity learning section executes step S11 and steps S16-S19, whereas the timing section executes steps S12-S15.

First, at step S11, a check is made to determine whether target capacity TLU1 before execution of fuel-cut is commanded. When it is determined that target capacity TLU1 has been commanded, the routine proceeds to step S12. Conversely when it is determined that target capacity TLU1 has not yet been commanded, the current control flow (execution cycle) terminates.

Then, through a series of steps S12-S15, a time Ts during which a slippage ΔN is within a predetermined range is measured. Hereupon, the term "slippage ΔN is within a predetermined range" means that the slippage is within a prescribed range in which slippage ΔN can be determined or regarded as a practically zero slippage, taking account of sensor noise, and which range is set or defined by an inequality |ΔN|<N1. Details of steps S12-S15 are hereunder described more concretely.

At step S12, a check is made to determine whether the absolute value |ΔN| of slippage ΔN is less than a predetermined infinitesimal value N1 (>0) suited to determine that no slip occur practically. When |Δ|<N1, the routine proceeds to step S13. Conversely when |ΔN|≥N1, the routine returns back to step S11.

At step S13, the time Ts (a timer) is counted up or incremented. Thereafter, the routine proceeds to step S14.

At step S14, a check is made to determine whether the absolute value |ΔN| of slippage ΔN is greater than or equal to the predetermined infinitesimal value N1. When |ΔN|≥N1, the routine proceeds to step S15. Conversely when |ΔN|<N1, the routine returns back to step S13.

At step S15, the count-up (increment) of the time Ts (the timer) terminates (stops). Thereafter, the routine proceeds to step S16.

Through a series of steps S16-S19, a check is made to determine whether the counted-up time (the measured time) Ts is identical to the predetermined target time T*. When the measured time Ts is not identical to the predetermined target time T*, target capacity TLU1 before execution of fuel-cut is corrected in a direction such that the measured time Ts is brought to the target time T*.

Hence, by repeatedly executing the correction to target capacity TLU1 every execution cycles of the control flow (that is, by repeated executions of the learning-correction), finally, the measured time Ts can be brought to the target time T*. In the first embodiment, the target time T*is set as a predetermined time (Tlim2≤T*≤Tlim1) between an upper limit Tlim1 and a lower limit Tlim2 so as to have a predetermined width. Details of steps S16-S19 are hereunder described more concretely.

At step S16, a check is made to determine whether the measured time Ts is greater than the upper limit Tlim1 of target time T*. When Ts>Tlim1, the routine proceeds to step S17. Conversely when Ts≤Tlim1, the routine proceeds to step S18.

At step S17, target capacity TLU1 is decreasingly corrected. For instance, a predetermined value (a predetermined amount) is subtracted from the target capacity TLU1. Thereafter, the routine proceeds to step S18.

At step S18, a check is made to determine whether the measured time Ts is less than the lower limit Tlim2 of target time T*. When Ts<Tlim2, the routine proceeds to step S19. Conversely when Ts≥Tlim2, the current control flow (execution cycle) terminates.

At step S19, target capacity TLU1 is increasingly corrected. For instance, a predetermined value (a predetermined amount) is added to the target capacity TLU1. Thereafter, the current control flow terminates.

Figure 4:
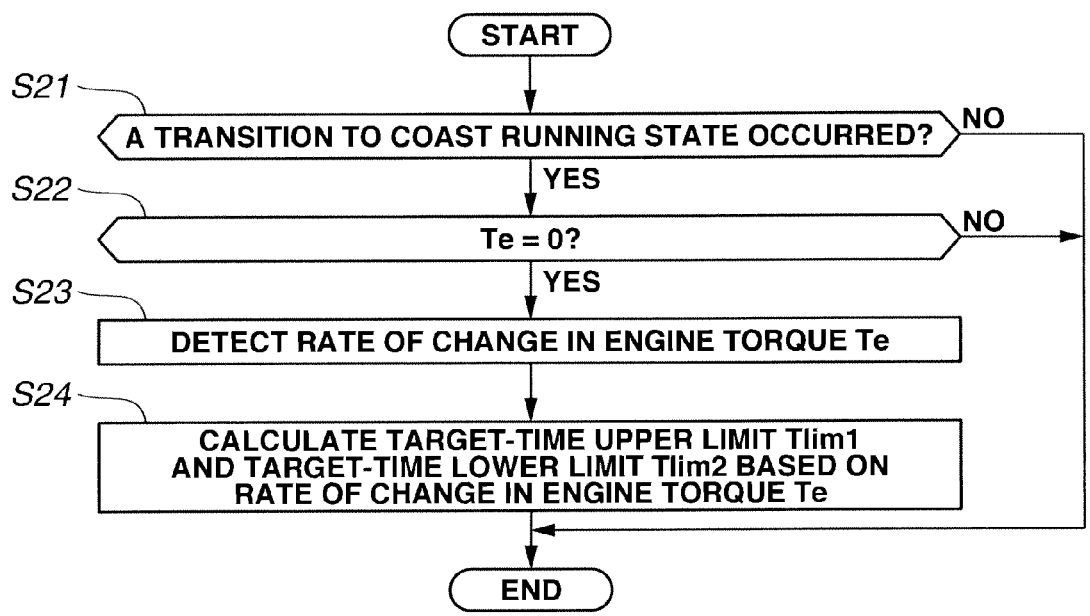
FIG. 4 is a flowchart illustrating target time setting processing performed by the capacity learning section of the first embodiment.

Referring to FIG. 4, there is shown the flowchart illustrating the procedures of arithmetic processing (setting of target time T*) executed within the capacity learning section. The arithmetic processing is executed as time-triggered interrupt routines to be triggered every predetermined time intervals, independently of the control processing of FIG. 3.

First, at step S21, in the same manner as step S1, a check is made to determine, based on throttle opening TVO and the like, whether a transition from a drive running state to a coast running state occurs. When it is determined that a transition to a coast running state has occurred, the routine proceeds to step S22. Conversely when it is determined that a transition to a coast running state has not occurred, the current control flow terminates.

At step S22, a check is made to determine whether engine torque Te is zero. For instance, the engine torque Te can be estimated or retrieved from a map concerning a fuel injection amount and an intake-air quantity (by the way, the engine torque Te can be given as a negative value owing to frictions of engine 1 and the like). When Te=0, the routine proceeds to step S23. Conversely when Te≠0 (in other words, when engine torque Te has not yet been reduced to below zero), the current control flow terminates.

At step S23, a rate of change (a rate of decrease or a gradient decrease) ΔTe in engine torque Te (at the point of time when engine torque Te becomes zero) is detected. Thereafter, the routine proceeds to step S24. For instance, the rate of change ΔTe can be detected as a finite difference between the previous value of engine torque Te of the previous control cycle (or the previous consecutive execution cycles) and the current value (=0) of engine torque Te of the current control cycle.

At step S24, an upper limit Tlim1 of target time T* and a lower limit Tlim2 of target time T* are both calculated or retrieved based on the rate of change ΔTe. Thereafter, the current control flow terminates.

Figure 5:
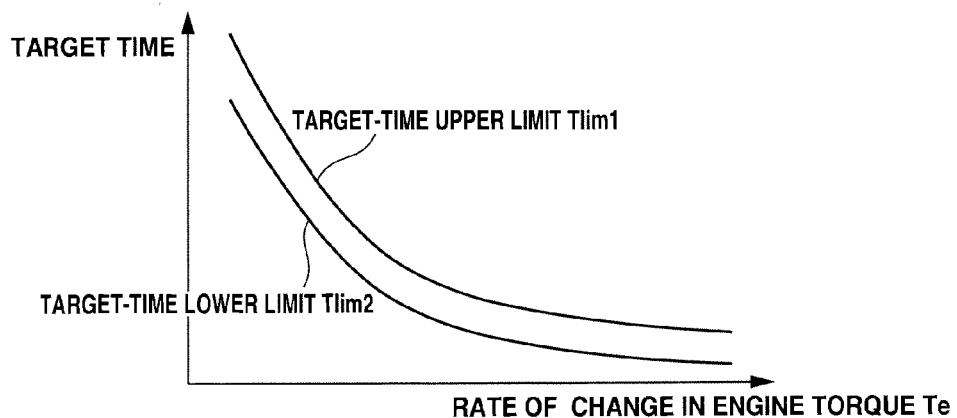
FIG. 5 is a characteristic map illustrating a prescribed relationship between a rate of change in engine torque and a target time, and used for the target time setting processing in the first embodiment.

Referring to FIG. 5, there is shown the characteristic map illustrating the prescribed relationship among a rate of change ΔTe, an upper limit Tlim1 of target time T*, and a lower limit Tlim2 of target time T*. The upper limit Tlim1 is set to be greater than the lower limit Tlim2 by a predetermined amount. Additionally, upper limit Tlim1 and lower limit Tlim2 are set to decrease, as the rate of change ΔTe increases. Concretely, within a narrow range of rate of change ΔTe from 0 to a predetermined value, upper limit Tlim1 and lower limit Tlim2 are set to steeply decrease, as the rate of change ΔTe increases. In contrast, within a wide range of rate of change ΔTe greater than or equal to the predetermined value, upper limit Tlim1 and lower limit Tlim2 are set to moderately decrease, as the rate of change ΔTe increases. For instance, the upper-limit characteristic is preset via experimental conformity, such that the upper limit Tlim1 is appropriately set to a maximum time that a lock-up engagement shock during a decreasing period of engine torque Te reaches a permissible level. Also, the lower-limit characteristic is preset via experimental conformity, such that the lower limit Tlim2 is appropriately set to a minimum time suited to determine that the stroke of the lock-up clutch does not return to the clutch release side (that is, an engagement-control response of the lock-up clutch to a slip state reaches a permissible level). At step S24, by map-retrieval of the preset map, upper limit Tlim1 and lower limit Tlim2 are both calculated based on the detected rate of change ΔTe.

[Operation]

Figure 6:
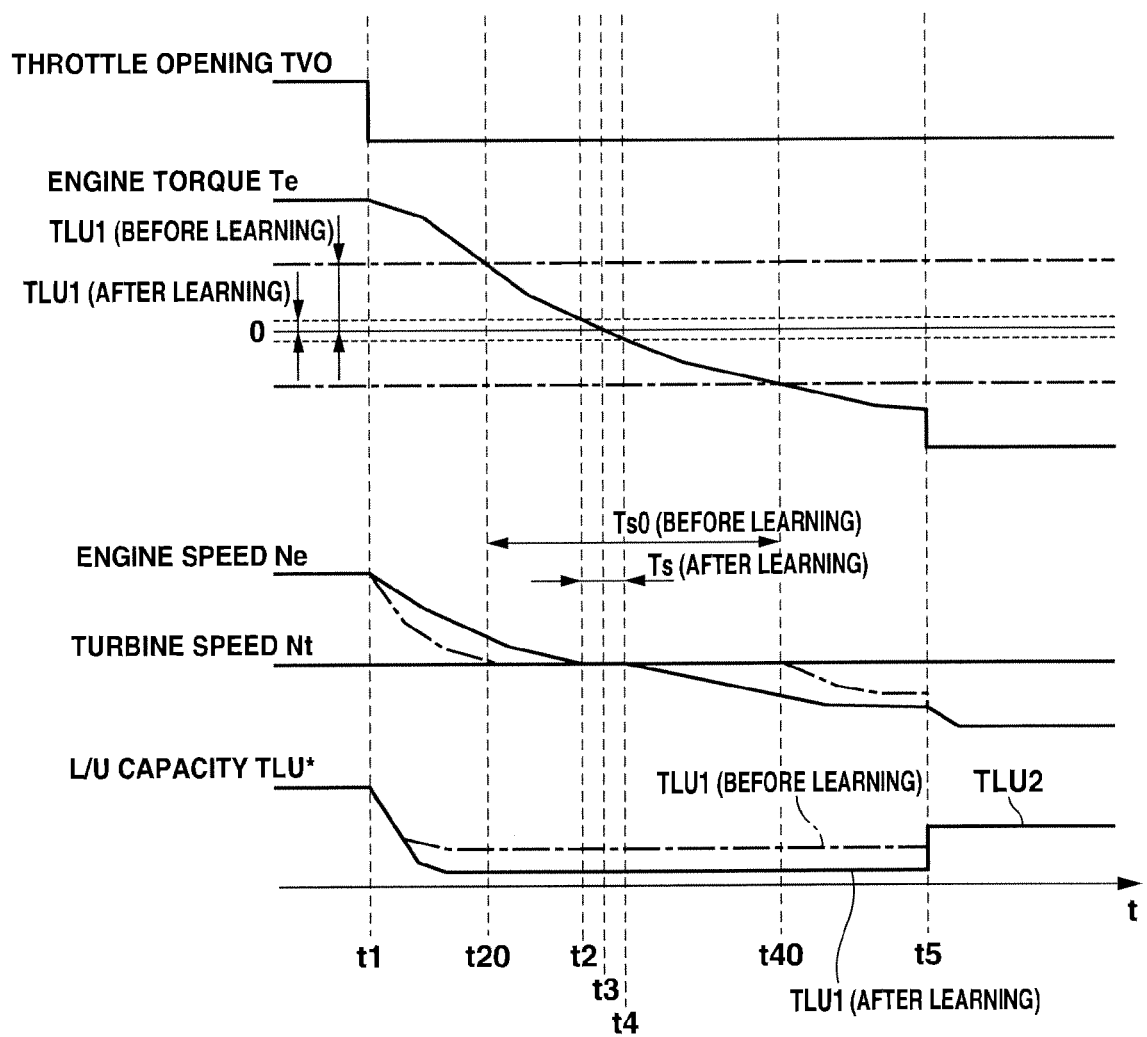
FIG. 6 is a time chart illustrating time variations in various time-varied parameters containing the target capacity in a transition to a coast running state in the first embodiment.
Figure 7:
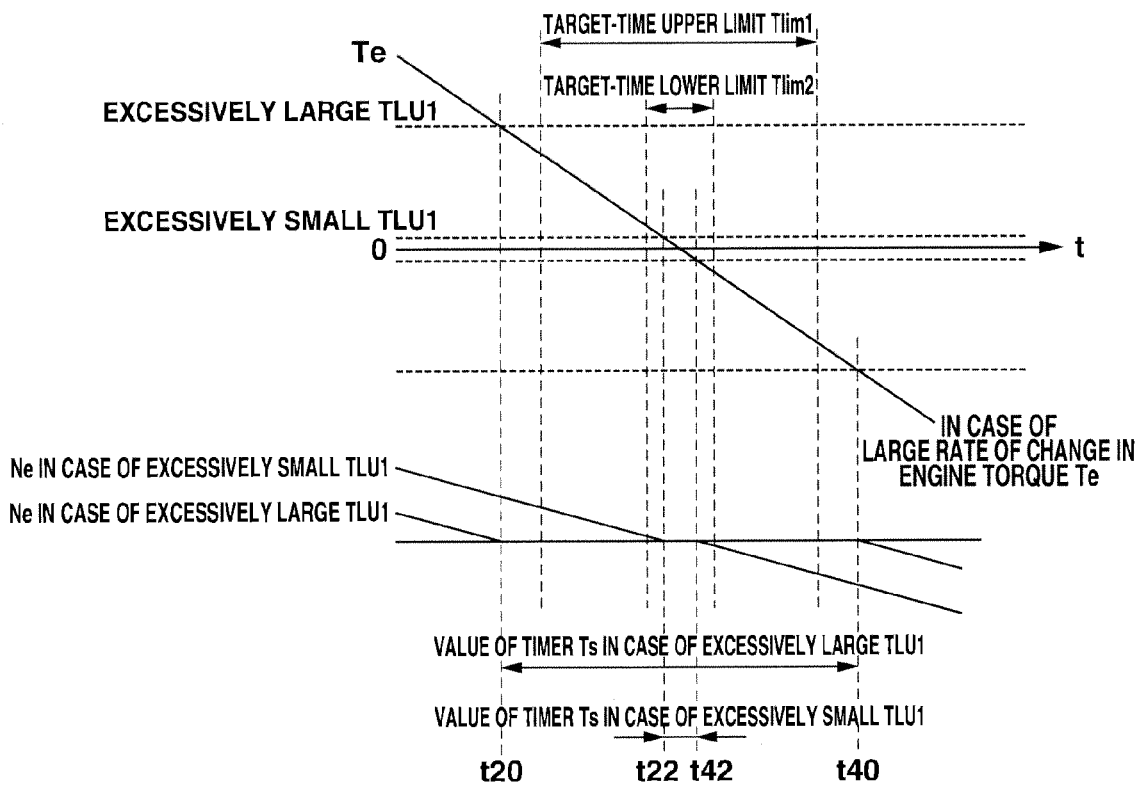
FIG. 7 is a partially enlarged view of a portion of the time chart of FIG. 6, substantially corresponding to a neighborhood of the time interval from the time t2 to the time t4, showing how a time during which a slippage is kept at a substantially zero slippage has to be varied depending on a target capacity.
Figure 8:
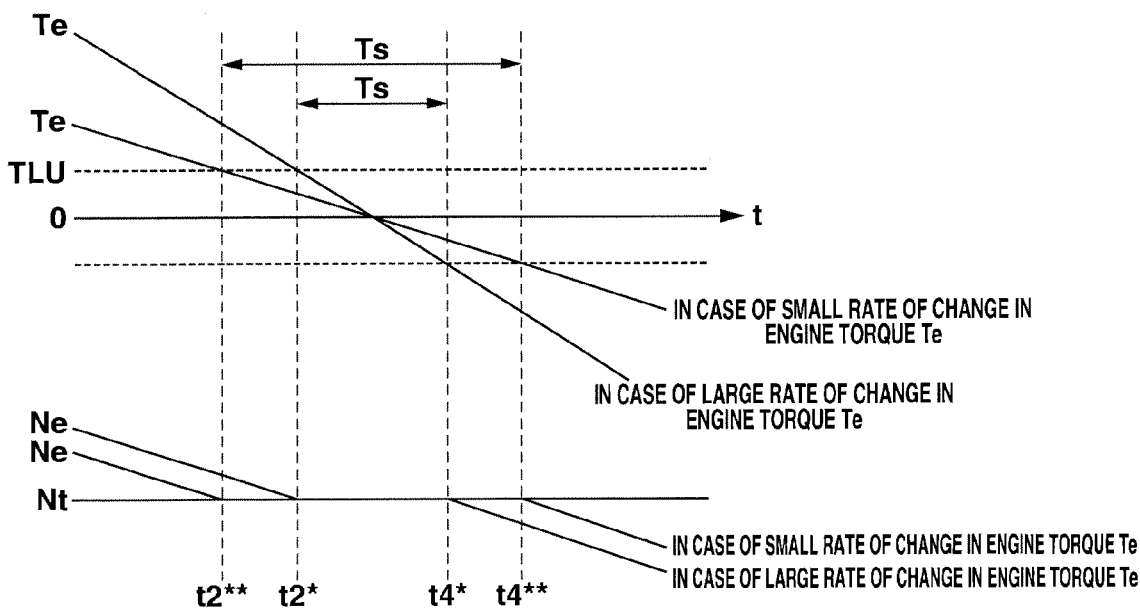
FIG. 8 is a partially enlarged view of a portion of the time chart of FIG. 6, substantially corresponding to a neighborhood of the time interval from the time t2 to the time t4, showing how a time during which a slippage is kept at a substantially zero slippage has to be varied depending on a rate of change in engine torque.

The operation, carried out based on the above-mentioned control processing, is hereunder described. FIGS. 6-8 are time charts illustrating the operation of the control device 21 of the first embodiment. FIG. 6 shows time variations in various time-varied parameters in the control device 21 of the first embodiment, such as throttle opening TVO, engine torque Te, engine speed Ne (revolution speed of the input element), turbine speed Nt (revolution speed of the output element), and target lock-up capacity TLU*, when a transition from a drive running state to a coast running state occurs. On one hand, a state where learning of target lock-up capacity TLU* (=TLU1) before execution of fuel-cut does not advance and thus target lock-up capacity TLU1 is excessively large is indicated by the one-dotted line. On the other hand, a state where learning of target lock-up capacity TLU1 advances is indicated by the solid line. By the way, in the following explanation, suppose that the actual lock-up capacity TLU is controlled in concert with the target capacity TLU*.

First, time variations in respective parameters under a state where target lock-up capacity TLU1 is excessively large are hereunder explained.

Before the time t1, throttle opening TVO is held at a given value and thus engine torque Te is a given positive value. That is, the running state is a drive running state, and hence engine speed Ne is held at a speed value higher than the turbine speed Nt. The lock-up clutch is slip-controlled such that target lock-up capacity TLU* is held at a given higher value as compared to a transient state (after the time t1).

At the time t1 when the driver's foot moves apart from the accelerator pedal 4 and thus the throttle valve 5 becomes fully closed (throttle opening TVO becomes zero). As a result, a transition from the drive running state to a coast running state occurs, and thus engine torque Te begins to gradually decrease. The lock-up clutch is slip-controlled such that target capacity TLU* is set to gradually decrease toward the target capacity TLU1 before fuel-cut. That is, in the first embodiment, target capacity TLU* does not drop to the target capacity TLU1 immediately after the time t1, but target capacity TLU* is set to gradually decrease during a certain time period by virtue of filter processing after the time t1. Owing to the decrease in engine torque Te, engine speed Ne begins to gradually decrease toward an idle speed, while turbine speed Nt (corresponding to vehicle speed VSP) is held at the same speed value as the turbine speed before the time t1. Hence, the speed difference between engine speed Ne and turbine speed Nt (i.e., slippage ΔN of the lock-up clutch) tends to gradually decrease.

The output torque Te (a positive value) of engine 1 exceeds the lock-up capacity TLU1 until the time t20. Owing to such an excess of torque, slippage ΔN (=Ne−Nt) takes place. The aforementioned torque excess also decreases in concert with the decrease in engine torque Te. At the time t20, the torque excess becomes zero. That is, owing to target capacity TLU1 before fuel-cut, which capacity is set to an excessively large value, at a comparatively earlier time t20, engine torque Te (a positive value) decreases to the lock-up capacity TLU1, and thus the magnitude of slippage ΔN becomes substantially zero (that is, the slippage becomes reduced to below the predetermined infinitesimal value N1). Accordingly, in the flowchart of FIG. 3, the flow, denoted by S11→S12→S13, occurs, and thus the count-up of the time Ts starts. After the time t20, the magnitude of engine torque Te is reduced to below the magnitude of lock-up capacity TLU1, and thus the lock-up clutch becomes engaged and slippage ΔN becomes substantially zero. Hence, in the flowchart of FIG. 3, the flow, denoted by S13→S14→S13, repeatedly occurs, until the time t40 that the magnitude of slippage ΔN (i.e., the absolute value |ΔN| of ΔN) becomes greater than or equal to the predetermined infinitesimal value N1 again. Therefore, the count-up of the time Ts is continuously executed.

At the time t3, engine torque Te becomes zero. After the time t3, engine torque Te becomes changed to a negative value. That is, a negative torque Te occurs in the output shaft of engine 1. In such a state where the torque Te is less than or equal to the lock-up capacity TLU, slippage ΔN is substantially zero.

Owing to target capacity TLU1 before fuel-cut, which capacity is set to an excessively large value, at a comparatively later time t40, the magnitude of engine torque Te (the negative value) increases to the lock-up capacity TLU1, and then exceeds the lock-up capacity TLU1. Owing to such an excess of torque, slippage ΔN (=Nt−Ne) takes place. That is, the lock-up clutch becomes a slip state, and thus the absolute value |ΔN| of the slippage tends to increase from a substantially zero slippage. In this manner, immediately when the absolute value |ΔN| of the slippage becomes greater than or equal to the predetermined infinitesimal value N1, in the flowchart of FIG. 3, the flow, denoted by S13→S14→S15, occurs, and thus the count-up of the time Ts terminates.

That is to say, the time Ts during which the lock-up clutch is kept engaged and slippage ΔN is kept at a substantially zero slippage, a time (a time length) Ts0 (=t40−t20) from the time t20 to the time t40 is measured.

At the time t5 when the predetermined cut-in delay time has expired from the point of time t1 when throttle valve 5 becomes fully closed, fuel-cut becomes initiated. Hence, target lock-up capacity TLU* becomes set to the value (the lock-up capacity) TLU2 after fuel-cut. After the time t5, the lock-up clutch becomes a coast lock-up state, and thus slippage ΔN is maintained at a predetermined value.

As discussed above, the measured time Ts0 exceeds the upper limit Tlim1 of target time T*, since target capacity TLU1 before fuel-cut is excessively large. Therefore, in the flowchart of FIG. 3, the flow, denoted by S15→S16→S17→S18→END, occurs, and thus target capacity TLU1 before fuel-cut is decreasingly corrected by the predetermined amount.

Next, time variations in respective parameters during learning-correction to target capacity TLU1 are explained. FIG. 7 is the partially enlarged view of a portion of the time chart of FIG. 6, substantially corresponding to a neighborhood of the time zone t2-t4 in which engine torque Te becomes a neighborhood of zero. As shown in FIG. 7, after a transition to the coast running state (before fuel cut-in), engine torque Te changes from positive to negative. When engine torque Te is in the neighborhood of zero, that is, under a state of |Te|<|TLU1|, the speed difference (i.e., slippage ΔN) between engine speed Ne and turbine speed Nt becomes substantially zero, and the lock-up clutch becomes engaged. When target capacity TLU1 is excessively large, the time Ts, during which slippage ΔN is kept at a substantially zero slippage, becomes a comparatively long time length Ts0 from the time t20 to the time t40. Conversely when target capacity TLU1 is excessively small, the time Ts, during which slippage ΔN is kept at a substantially zero slippage, becomes a comparatively short time length from the time t22 to the time t42. Hereupon, the target time T* is comprised of the upper limit Tlim1 and the lower limit Tlim2 less than the upper limit Tlim1. As shown in FIG. 7, the target time T* is set as a value having a predetermined width defined between the upper limit Tlim1 and the lower limit Tlim2. As described later, the time Ts, during which the slippage is kept at a substantially zero slippage, is controlled in a manner so as to be positioned between the upper limit Tlim1 and the lower limit Tlim2. That is, when a transition from a drive running state to a coast running state occurs in a state where target capacity TLU1 before fuel-cut has been set to an excessively large value, as previously discussed, target capacity TLU1 is decreasingly corrected by the predetermined amount, and thus decremented. When a transition from a drive running state to a coast running state occurs next time, target capacity TLU1, decreasingly corrected by the predetermined amount, is used for control. At this time, suppose that target capacity TLU1 is still excessively large. In the same manner as discussed previously, target capacity TLU1 is decreasingly corrected again by the predetermined amount. Therefore, the length of the measured time Ts gradually shortens from the time length Ts0 every repetitions of a transition to a coast running state, as long as target capacity TLU1 is excessively large. When the measured time Ts becomes less than or equal to the upper limit Tlim1 under a transition to a certain coast running state, in the flowchart of FIG. 3, the flow, denoted by S15→S16→S18, occurs, and thus the correction decreasingly made to target capacity TLU1 becomes disabled (inhibited). Conversely when the measured time Ts becomes less than the lower limit Tlim2 under a transition to a certain coast running state, in the flowchart of FIG. 3, the flow, denoted by S15→S16→S18→S19, occurs, and thus the lock-up capacity TLU1 is increasingly corrected by the predetermined amount. Hence, by repeated transitions to a coast running state, a learning-correction to target capacity TLU1 is made, such that the time Ts, during which the magnitude of slippage ΔN is kept less than the predetermined infinitesimal value N1, is finally brought closer to the predetermined target time T* between the lower limit Tlim2 and the upper limit Tlim1. As indicated by the solid line in FIG. 6, target capacity TLU1 can be set to an appropriate smaller value as compared to an excessively large capacity at an initial time. As the time Ts during which slippage ΔN is kept at a substantially zero slippage, a time (a time length) from the time t2 to the time t4 is measured. This measured time Ts becomes shorter than the measured time Ts0 (the time length from t20 to t40) before learning of target capacity TLU1.

Hitherto, a device, in which a lock-up capacity is set to a minimum capacity corresponding to a standby pressure needed to return to a state just before initiating engagement (lock-up) by feed-forward control during a predetermined time period, when a transition from a drive running state to a coast running state has occurred, is generally known (see Patent document 1). However, there is no disclosure how the lock-up capacity is set to a minimum capacity corresponding to a standby pressure, and therefore there was room for improvement. Concretely, there is a possibility that the following task occurs.

(1) Due to individual differences of devices manufactured, in the case that a preset lock-up capacity is excessively large, a shock, arising from transient engagement during an engine-torque decreasing period, and a shock, arising from fuel cut-in under a lock-up engaged state, occur.

(2) Due to individual differences of devices manufactured, in the case that a preset lock-up capacity is excessively small, the stroke of the lock-up clutch tends to return to its original state, and thus the control response of the lock-up clutch to a slip state during fuel cut-in tends to slow. As a result, an unlock-up state occurs, and hence fuel-cut is undesirably stopped.

In contrast to the above, according to the control device 21 of the first embodiment, a learning-correction to target lock-up capacity TLU1 is made based on the time Ts, while paying attention to a correlation between the time Ts and the lock-up capacity TLU such that the time Ts, during which slippage ΔN is within a predetermined range (a substantially zero slippage), varies depending on the lock-up capacity TLU, when the vehicle has shifted from a drive running state to a coast running state. That is, every repetition of a transition to a coast running state, target capacity TLU1 is adjusted in a direction such that the time Ts is brought to the predetermined target time T*. Hence, irrespective of whether target lock-up capacity TLU1 is excessively large or excessively small due to individual differences of devices manufactured when a transition to a coast running state has occurred, it is possible to correct the target capacity TLU1 to a capacity such that the time Ts during which slippage ΔN is kept at a substantially zero slippage is brought to the predetermined target time T* (that is, an appropriate capacity suitable for suppression of a shock, arising from transient engagement during an engine-torque decreasing period, and a shock, arising from fuel cut-in under a lock-up engaged state, and suppression of a situation where fuel-cut becomes stopped without shifting the lock-up clutch into engagement during fuel cut-in). Accordingly, it is possible to eliminate the inconvenience as discussed above.

In the first embodiment, the target time T* is comprised of upper limit Tlim1 and lower limit Tlim2, and set to have a predetermined width. Thus, it is possible to suppress a situation where a correction to target capacity TLU* (TLU1) is frequently executed. Additionally, it is possible to execute the learning-correction to target capacity TLU* (TLU1) such that the target capacity is adjusted to a capacity within a predetermined range except excessively large and excessively small values (for instance, a prescribed range capable of permitting a shock during transient engagement and also permitting a slip-control response during coasting).

The capacity learning section is configured to decrease the target time T*, as the rate of decrease ΔTe in engine torque Te when a transition to a coast running state has occurred increases. That is, for the same lock-up capacity TLU1, the time during which a state of |Te|<|TLU1| is satisfied, that is, the time Ts during which the slippage ΔN (the speed difference between engine speed Ne and turbine speed Nt) is within the predetermined range (a practically zero slippage) varies depending on the rate of change (the rate of decrease) of engine torque Te. FIG. 8 is the partially enlarged view of a portion of the time chart of FIG. 6, substantially corresponding to a neighborhood of the time zone t2-t4 in which engine torque Te becomes a neighborhood of zero. As shown in FIG. 8, when the rate of decrease of engine torque Te is small, the time Ts becomes a time length from the time t2 to the time t4. Conversely when the rate of decrease of engine torque Te is large, the time Ts becomes a time length from the time t2* to the time t4*. In this manner, the time Ts shortens, as the rate of decrease of engine torque Te increases. For this reason, on the assumption that the target time T* is fixed regardless of the rate of decrease in engine torque Te, for the same lock-up capacity TLU1, the time Ts is determined or regarded as to be shorter than the target time T* when the rate of decrease in engine torque Te is large, and also determined or regarded as to be longer than the target time T* when the rate of decrease in engine torque Te is small. In such a case, there is a possibility of an inappropriate correction made to the lock-up capacity TLU1. In contrast to the above, in the first embodiment, the target time T* is set depending on a rate of decrease in engine torque Te when a transition to a coast running state has occurred. Concretely, when a transition to a coast running state has occurred, the time Ts (see steps S12-S15 of FIG. 3), measured by the timing section, is compared to the target time T* (see steps S22-S24 of FIG. 4), set by the capacity learning section. The capacity learning section sets the above-mentioned target time T* (the upper limit Tlim1 and the lower limit Tlim2) based on the rate of change (the rate of decrease) ΔTe in engine torque Te, retrieving the map of FIG. 5. Hence, regardless of a difference of the rate of decrease in engine torque Te when a transition to a coast running state has occurred, it is possible to appropriately execute a correction to target lock-up capacity TLU1, utilizing the time Ts.

Regarding the rate of decrease in engine torque Te "when a transition to a coast running state has occurred", in the first embodiment, the target time T* is set based on the rate of decrease in engine torque Te "when engine torque Te (a positive value) becomes substantially zero". In this manner, by watching the rate of decrease in engine torque Te under a state of low torque that the speed difference of the lock-up clutch becomes substantially zero, that is, the rate of decrease in engine torque Te whose influence can be more remarkably reflected on the time Ts, it is possible to more appropriately set the target time T*. By the way, without being limited to the rate of decrease in engine torque Te when engine torque Te becomes substantially zero, for instance, the target time T* may be set based on the rate of decrease in engine torque Te when slippage ΔN becomes substantially zero. Also, in the first embodiment, the target time T* is set such that upper limit Tlim1 and lower limit Tlim2 both decrease (such that the width of target time T* is almost the same with respect to the rate of decrease in engine torque), as the rate of decrease in engine torque Te increases. Without being limited to this, for instance, the target time T* may be set such that only the upper limit Tlim1 decreases (such that the width of target time T* decreases), as the rate of decrease in engine torque Te increases. Furthermore, in the first embodiment, upper limit Tlim1 and lower limit Tlim2 of target time T* are both set by the use of the preset map every rate of decrease in engine torque Te. Without being limited to this, for instance, upper limit Tlim1 and lower limit Tlim2 of target time T* may be corrected by arithmetic processing, depending on the rate of decrease in engine torque Te.

The effects of the control device 21 of the first embodiment are hereunder enumerated.

(1) In a lock-up capacity control device (transmission controller 21) of a torque converter 3, which drivingly couples a prime mover (engine 1) and a transmission (automatic transmission 2) and on which a lock-up mechanism is installed for engaging an input element (a pump impeller) on a side of the prime mover with an output element (a turbine runner) on a side of the transmission depending on a lock-up capacity TLU, the lock-up capacity control device being configured to control the lock-up capacity TLU depending on an operating condition, the lock-up capacity control device is provided with a lock-up capacity control means (a lock-up capacity control section) for controlling the lock-up capacity TLU to a predetermined target capacity TLU* (TLU1) when a transition from a drive running state to a coast running state occurs, a timing means (a timing section) for measuring a time (a time length) Ts during which a slippage ΔN, which is a difference between a revolution speed (engine speed Ne) of the input element and a revolution speed (turbine speed Nt) of the output element, is within a predetermined range (|ΔN|<N1) when the lock-up capacity TLU is controlled to the target capacity TLU* (TLU1), and a capacity learning means (a capacity learning section) for making a learning-correction to the target capacity TLU* (TLU1) such that the time Ts measured by the timing means is brought to a predetermined target time T*.

Hence, by virtue of the learning-correction made to the target capacity TLU* (TLU1), it is possible to more accurately control the lock-up capacity TLU when a transition to a coast running state has occurred. Therefore, it is possible to provide superior effects, such as suppression of the occurrence of a shock in a transient state, improved ride, and the like.

(2) The target time T* comprises a target-time upper limit Tlim1 and a target-time lower limit Tlim2 less than the target-time upper limit Tlim1.

As discussed above, the target time T* is set to have a predetermined width, and thus it is possible to suppress a situation where a correction to target capacity TLU* (TLU1) is frequently executed. Additionally, it is possible to execute the learning-correction to target capacity TLU* (TLU1) such that the target capacity is adjusted to a capacity within a predetermined range except excessively large and excessively small values.

(3) The capacity learning means is configured to decrease the target time T*, as a rate of decrease ΔTe in a driving force (engine torque Te) of the prime mover when the transition to the coast running state has occurred increases.

Hence, regardless of a difference of the rate of decrease in engine torque Te every transition to a coast running state, it is possible to appropriately execute a correction to target capacity TLU* (TLU1).

Second Embodiment

Figure 9:
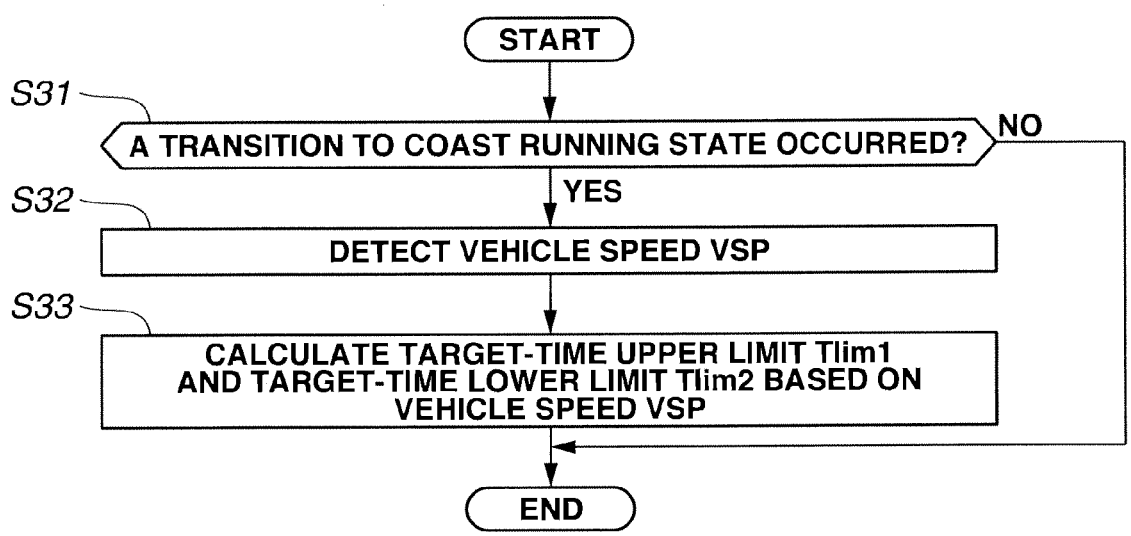
FIG. 9 is a flowchart illustrating target time setting processing performed by the capacity learning section of the second embodiment.

The lock-up capacity control device 21 of the second embodiment is configured to decrease the target time T*, as the vehicle speed VSP when a transition to a coast running state has occurred increases. By the way, the other configuration is similar to the first embodiment, and thus detailed description of the similar configuration will be omitted because the above description thereon seems to be self-explanatory. Referring now to FIG. 9, there is shown the flowchart illustrating the procedures of arithmetic processing (setting of target time T*) executed within the capacity learning section. The arithmetic processing is executed as time-triggered interrupt routines to be triggered every predetermined time intervals independently of the control processing of FIG. 3.

At step S31, a check is made to determine whether a transition from a drive running state to a coast running state occurs. That is, when throttle opening TVO becomes zero, it is determined that a transition to a coast running state has occurred. When it is determined that a transition to a coast running state has occurred, the routine proceeds to step S32. Conversely when it is determined that a transition to a coast running state has not yet occurred, the current control flow terminates.

At step S32, vehicle speed VSP at the current execution cycle is detected, and then the routine proceeds to step S33.

At step S33, an upper limit Tlim1 of target time T* and a lower limit Tlim2 of target time T* are both calculated or retrieved based on the detected vehicle speed VSP. Thereafter, the current control flow terminates.

Figure 10:
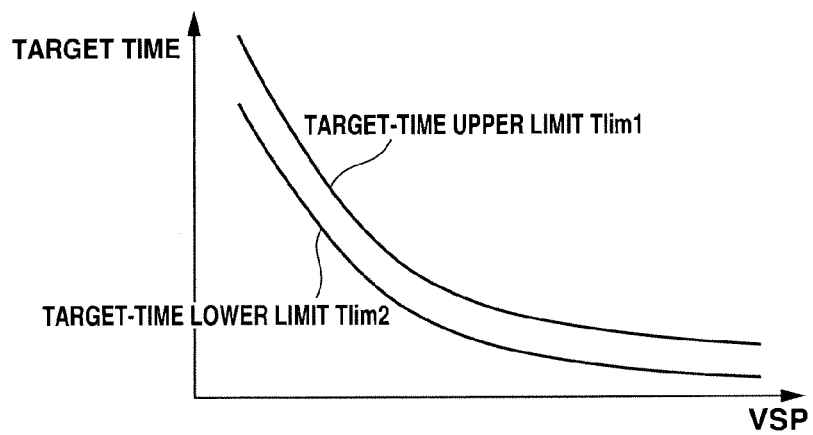
FIG. 10 is a characteristic map illustrating a prescribed relationship between a vehicle speed and a target time and used for the target time setting processing in the second embodiment.

Referring to FIG. 10, there is shown the characteristic map illustrating the prescribed relationship among a vehicle speed VSP, an upper limit Tlim1 of target time T*, and a lower limit Tlim2 of target time T*. The characteristic map, illustrating the prescribed relationship, is similar to the map such that a rate of change ΔTe in engine torque is replaced with a vehicle speed VSP in the map of FIG. 5. Upper limit Tlim1 and lower limit Tlim2 are set to decrease, as the vehicle speed VSP increases. At step S33, by map-retrieval of the preset map, upper limit Tlim1 and lower limit Tlim2 are both calculated based on the vehicle speed VSP.

In setting the target time T*, suppose that the estimated value of engine torque Te (rate of decrease ΔTe) is used like the first embodiment. In some cases, an error (a deviation) between the estimated value and the actual engine torque Te (ΔTe) may be great. As discussed above, in the case that engine torque Te cannot be accurately detected, the target time T* can be calculated by the use of vehicle speed VSP. In this case, it is possible to execute the learning-correction to target lock-up capacity TLU1 when a transition to a coast running state has occurred more accurately rather than setting of the target time T* based on engine torque Te. That is, when vehicle speed VSP when a transition from a drive running state to a coast running state has occurred is high, a running resistance is great, and thus it is assumed that engine torque Te in the drive running state is also high. Therefore, it is assumed that the rate of decrease in engine torque Te is great, in the case that vehicle speed VSP when a transition to a coast running state has occurred is high.

Hence, in the second embodiment, as the vehicle speed VSP "when a transition to a coast running state has occurred", vehicle speed VSP "at the point of time of a transition to a coast running state" is used, and thus it is possible to more accurately set the target time T*. By the way, without being limited to the vehicle speed at the point of time of a transition to a coast running state, vehicle speed VSP at a given point of time during a time period from a transition from a drive running state to a coast running state to the time when coast lock-up becomes established (in other words, fuel-cut becomes established) may be used. Also, in the second embodiment, the target time T* is set such that upper limit Tlim1 and lower limit Tlim2 both decrease, as the vehicle speed VSP at the point of time of a transition to coast running state increases. Without being limited to this, for instance, the target time T* may be set such that only the upper limit Tlim1 decreases (such that the width of target time T* decreases), as the vehicle speed VSP increases. Furthermore, in the second embodiment, upper limit Tlim1 and lower limit Tlim2 of target time T* are both set by the use of the preset map every vehicle speed VSP. Without being limited to this, for instance, upper limit Tlim1 and lower limit Tlim2 of target time T* may be corrected by arithmetic processing, depending on the vehicle speed VSP.

The control device 21 of the second embodiment can provide the following effect in addition to the previously-discussed effects (1) and (2) of the first embodiment.

(4) The capacity learning means (the capacity learning section) is configured to decrease the target time T*, as a vehicle speed VSP when the transition to the coast running state has occurred increases. Hence, even in the presence of a deviation of the rate of decrease in engine torque Te from the actual value, it is possible to appropriately execute a correction to target capacity TLU* (TLU1).

Third Embodiment

Figure 11:
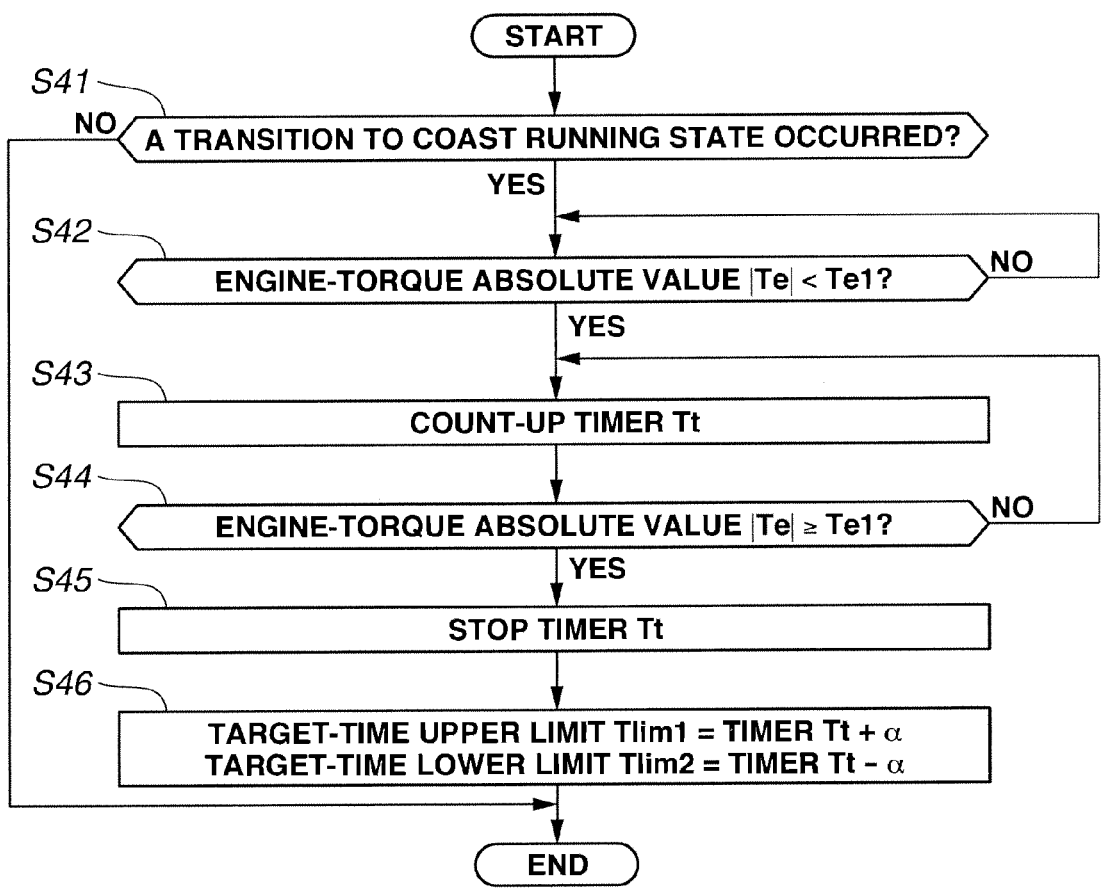
FIG. 11 is a flowchart illustrating target time setting processing performed by the capacity learning section of the third embodiment.

The lock-up capacity control device 21 of the third embodiment is configured to measure a time Tt during which engine torque Te is within a predetermined range when a transition to a coast running state has occurred and to set the measured time Tt as a target time T*. By the way, the other configuration is similar to the first embodiment, and thus detailed description of the similar configuration will be omitted because the above description thereon seems to be self-explanatory. Referring now to FIG. 11, there is shown the flowchart illustrating the procedures of arithmetic processing (setting of target time T*) executed within the capacity learning section. The arithmetic processing is executed as time-triggered interrupt routines to be triggered every predetermined time intervals independently of the control processing of FIG. 3.

At step S41, in the same manner as step S21, a check is made to determine whether a transition from a drive running state to a coast running state occurs. When it is determined that a transition to a coast running state has occurred, the routine proceeds to step S42. Conversely when it is determined that a transition to a coast running state has not occurred, the current control flow terminates.

Through a series of steps S42-S45, the time Tt, during which the magnitude of engine torque Te is within the predetermined range (|Te|<Te1), is measured.

At step S42, a check is made to determine whether the absolute value |Te| of engine torque Te is less than a predetermined value Te1 (>0). The predetermined value Te1 is set to a prescribed level capable of permitting a shock during engagement even when the lock-up clutch becomes engaged (slippage ΔN becomes substantially zero) as soon as engine torque Te reaches the predetermined value Te1. When |Te|<Te1, the routine proceeds to step S43. Conversely when |Te|≥Te1, step S42 is repeatedly executed.

At step S43, the time Tt (a timer) is counted up or incremented. Thereafter, the routine proceeds to step S44.

At step S44, a check is made to determine whether the absolute value |Te| of engine torque Te is greater than or equal to the predetermined value Te1. When |Te|≥Te1, the routine proceeds to step S45. Conversely when |Te|<Te1, the routine returns back to step S43.

At step S45, the count-up (increment) of the time Tt (the timer) terminates (stops). Thereafter, the routine proceeds to step S46.

At step S46, an upper limit Tlim1 of target time T* is calculated by adding a predetermined time α to the time Tt (the timer), whereas a lower limit Tlim2 of target time T* is calculated by subtracting the predetermined time α from the time Tt (the timer). Then, the current control flow (execution cycle) terminates. That is, in the same manner as the first embodiment and the second embodiment, "target time T*" is set so as to have a width (±α) by which the measured time Tt can be determined as the target time.

[Operation]

Figure 12:
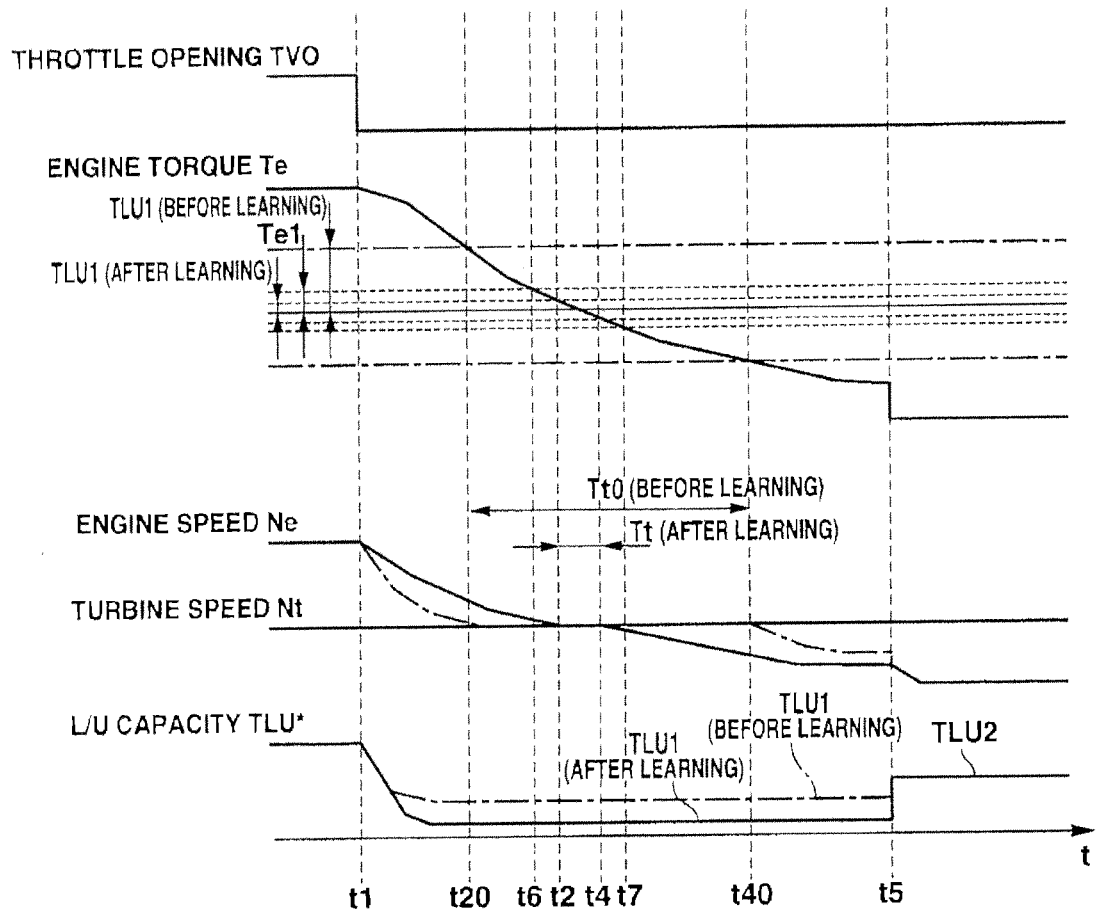
FIG. 12 is a time chart illustrating time-varied various parameters containing the target capacity in a transition to a coast running state in the third embodiment.
Figure 13:
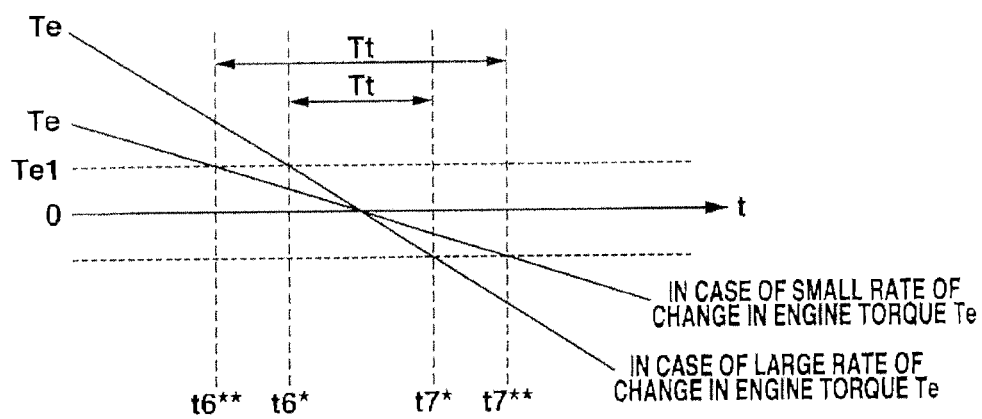
FIG. 13 is a partially enlarged view of a portion of the time chart of FIG. 12, substantially corresponding to a neighborhood of the time interval from the time t6 to the time t7, showing how a target time has to be varied depending on a rate of change in engine torque.

The operation, carried out based on the above-mentioned control processing, is hereunder described. FIGS. 12-13 are time charts illustrating the operation of the control device 21 of the third embodiment. FIG. 12 is the time chart similar to FIG. 6 and shows time variations in various time-varied parameters in the control device 21 of the third embodiment. A state, in which learning of target lock-up capacity TLU1 does not advance and thus target lock-up capacity TLU1 is excessively large, is indicated by the one-dotted line. A state, in which learning of target lock-up capacity TLU1 advances, is indicated by the solid line.

Under a state where target lock-up capacity TLU1 before execution of fuel-cut is excessively large, the time Tt, during which the magnitude of slippage ΔN is kept less than the predetermined infinitesimal value N1, becomes the time length from the time t20 to the time t40, in the same manner as the first embodiment (see steps S11-S15 of FIG. 3).

At the time t6 after the time t20, the magnitude of engine torque Te (decreasing while taking a positive value) becomes reduced to below the predetermined value Te1. Accordingly, in the flowchart of FIG. 11, the flow, denoted by S41→S42→S43, occurs, and thus the count-up of the time Tt (the timer) starts. After the time t6, at the time t7 before the time t40, the magnitude of engine torque Te (increasing while taking a negative value) becomes greater than or equal to the predetermined value Te1. Therefore, in the flowchart of FIG. 11, the flow, denoted by S43→S44→S45, occurs, and thus the count-up of the time Tt (the timer) terminates (stops). That is, the time Tt from the time t6 to the time t7 is measured. The value, obtained by adding the predetermined time α to the measured time Tt, is set as the upper limit Tlim1 of target time T*, while the value, obtained by subtracting the predetermined time α from the measured time Tt is set as the lower limit Tlim2 of target time T*. Under a state where target lock-up capacity TLU1 is excessively large, the measured time Tt (the time length t40-t20 from the time t20 to the time t40) tends to exceed the upper limit Tlim1 (the time length from the time t6 to the time t7+α). Thus, target lock-up capacity TLU1 is decreasingly corrected by the predetermined amount, when a transition to a coast running state has occurred (see steps S16-S17 of FIG. 3).

The time Tt is measured each time a transition from a drive running state to a coast running state is repeated (see steps S41-S45 of FIG. 11). Target time T* (upper limit Tlim1 and lower limit Tlim2) is set based on the measured time Tt (see step S46 of FIG. 11). Additionally, a correction is made to decrease or increase the target lock-up capacity TLU1 (see steps S16-S19 of FIG. 3) when the measured time Tt (see steps S41-S45 of FIG. 11) is outside of the target time T*. Hence, a learning-correction to target lock-up capacity TLU1 is made such that the measured time Tt is brought within the range of target time T*.

As discussed above, by measuring the time Tt during which engine torque Te is within the predetermined range when a transition to a coast running state has occurred, and by setting the measured time Tt (±α) as the target time T*, it is possible to set the target time T* to an appropriate value, while eliminating man-hours for experimental conformity. That is to say, the time Tt during which engine torque Te is within a predetermined range (|Te|<Te1) is measured, and a learning-correction to target lock-up capacity TLU1 is made such that the lock-up clutch becomes temporarily engaged (the slippage ΔN becomes less than the predetermined infinitesimal value N1) for the time Tt. Hence, it is possible to execute a learning-correction to lock-up capacity TLU1 such that the target lock-up capacity is adjusted to the predetermined value Te1, that is, a capacity within a prescribed range capable of permitting a shock during engagement during a time period from a transition from a drive running state to a coast running state to the time when coast lock-up becomes established (in other words, fuel-cut becomes established).

Hereupon, the time Tt during which engine torque Te is within the predetermined range (|Te|<Te1) varies depending on the rate of change (the rate of decrease) in engine torque Te. Hence, it is possible to set an appropriate target time T* without taking man-hours for setting target time T* via experimental conformity every rate of decrease in engine torque Te and vehicle speed VSP like the first and second embodiments. That is, as shown in FIG. 8, for the same lock-up capacity, the time Ts shortens, as the rate of decrease in engine torque Te increases. For this reason, on the assumption that the target time T* is fixed regardless of the rate of decrease in engine torque Te, there is a possibility of an inappropriate correction made to the lock-up capacity TLU1. In contrast to the above, in the third embodiment, the time Tt (±α) during which engine torque Te is within the predetermined range (|Te|<Te1) is set as the target time T*. Accordingly, this is synonymous with setting of target time T* based on the rate of decrease in engine torque Te when a transition to a coast running state occurs. FIG. 13 is the partially enlarged view of a portion of the time chart of FIG. 12, substantially corresponding to a neighborhood of the time zone t6-t7 in which engine torque Te becomes a neighborhood of zero. As shown in FIG. 13, when the rate of decrease of engine torque Te is small, the time Tt, during which the magnitude of engine torque Te is less than the predetermined value Te1, becomes a comparatively long time length from the time t6 to the time t7. Conversely when the rate of decrease of engine torque Te is large, the time Tt becomes a comparatively short time length from the time t6* to the time t7*. That is, the time Tt shortens, as the rate of decrease in engine torque Te increases. Hence, target time T* (upper limit Tlim1 and lower limit Tlim2) is set to decrease, as the rate of decrease ΔTe increases. In this manner, by setting target time T* based on the rate of decrease ΔTe, it is possible to suppress the target lock-up capacity TLU1 from being inappropriately corrected due to fluctuations in the rate of decrease ΔTe. By the way, regarding the rate of decrease ΔTe in engine torque Te "when a transition to a coast running state has occurred", in the same manner as the first embodiment, in the third embodiment the target time T* is set based on the rate of decrease in engine torque Te "when engine torque Te becomes substantially zero (|Te|<Te1)". In a similar manner to the first embodiment, it is possible to more appropriately set the target time T*.

As discussed above, in a similar manner to the first embodiment, according to the control device 21 of the third embodiment, by setting an appropriate target time T* regardless of fluctuations in the rate of decrease of engine torque Te, it is possible to appropriately correct the target lock-up capacity TLU1. Furthermore, it is possible to set an appropriate target time T* without taking man-hours for setting target time T* via experimental conformity every rate of decrease in engine torque Te and vehicle speed VSP like the first and second embodiments.

The control device 21 of the third embodiment can provide the following effect in addition to the previously-discussed effects (1) and (2) of the first embodiment.

(5) Further provided is a second timing means (see steps S41-S45 of FIG. 11) for measuring a time (a time length) Tt during which a driving force (engine torque Te) of the prime mover is within a predetermined range (|Te|<Te1) when the transition to the coast running state has occurred. The capacity learning means (the capacity learning section) is configured to set the time Tt measured by the second timing means as the target time T* (see step S46 of FIG. 11).

Hence, regardless of a difference of the rate of decrease in engine torque Te when a transition to a coast running state has occurred, it is possible to appropriately but simply execute a correction to target capacity TLU* (TLU1).

OTHER EMBODIMENTS

While the foregoing is a description of the preferred embodiments carried out the lock-up capacity control device of the invention with reference to the first, second, and third embodiments, it will be understood that the invention is not limited to the particular embodiments shown and described herein, but that various changes and modifications may be made without departing from the scope or spirit of this invention.

For instance, in the shown embodiments, an engine is used as a prime mover. Without being limited to this, the prime mover may be comprised of a motor. Also, an automatic transmission is not limited to a stepped automatic transmission whose number of speeds is limited or finite, but a continuously variable transmission may be used.

In the shown embodiments, when the throttle opening becomes zero, it is determined that a transition from a drive running state to a coast running state has occurred. Without being limited to this, when the accelerator opening becomes zero, it may be determined that a transition from a drive running state to a coast running state has occurred.

In the shown embodiments, a start of fuel-cut (i.e., fuel cut-in) is carried out immediately after a predetermined cut-in delay time has expired. Without being limited to this, when other conditions are satisfied, fuel cut-in may be carried out.

In the shown embodiments, the invention is applied to a control system configured to establish a slip lock-up state during coast running. Without being limited to this, the invention may be applied to a control system configured to establish a complete lock-up state during coast running. Also, in the shown embodiments, a situation where a transition from a drive running state to a coast running state occurs under a slip lock-up state is exemplified. In lieu thereof, the invention may be applied to a situation where a transition from a drive running state to a coast running state occurs under a complete lock-up state.

The invention claimed is:

1. A lock-up capacity control device of a torque converter, which drivingly couples a prime mover and a transmission and on which a lock-up mechanism is installed for engaging an input element on a side of the prime mover with an output element on a side of the transmission depending on a lock-up capacity, the lock-up capacity control device being configured to control the lock-up capacity depending on an operating condition, the lock-up capacity control device comprising a controller configured to:
   control the lock-up capacity to a predetermined target capacity when a transition from a drive running state to a coast running state occurs;
   measure a time during which a slippage, which is a difference between a revolution speed of the input element and a revolution speed of the output element, is within a predetermined range when the lock-up capacity is controlled to the target capacity; and
   make a learning-correction to the target capacity such that the measured time is brought to a predetermined target time,
   wherein the lock-up mechanism is configured to operate based on the learning-corrected target capacity in a transient state after the transition from the drive running state to the coast running state.

2. A lock-up capacity control device of a torque converter as claimed in claim 1, wherein:
   the target time comprises a target-time upper limit and a target-time lower limit less than the target-time upper limit.

3. A lock-up capacity control device of a torque converter as claimed in claim 1, wherein:
   the controller is configured to decrease the target time, as a rate of decrease in a driving force of the prime mover when the transition to the coast running state has occurred increases.

4. A lock-up capacity control device of a torque converter as claimed in claim 1, wherein:
   the controller is configured to decrease the target time, as a vehicle speed when the transition to the coast running state has occurred increases.

5. A lock-up capacity control device of a torque converter as claimed in claim 1, wherein:
   the controller is configured to measure a second time during which a driving force of the prime mover is within a predetermined range when the transition to the coast running state has occurred, and to set the second time as the target time.

6. A lock-up capacity control device of a torque converter as claimed in claim 1, wherein:
   the predetermined range of the slippage is set to an infinitesimal range in which the slippage can be regarded as a practically zero slippage.

7. A lock-up capacity control device of a torque converter as claimed in claim 5, wherein:
the predetermined range of the driving force is set to an infinitesimal range corresponding to a neighborhood of zero.

* * * * *